United States Patent [19]

Flury

[11] Patent Number: 4,724,994

[45] Date of Patent: Feb. 16, 1988

[54] WAVE-SOLDERING DEVICE

[76] Inventor: Karl Flury, Bergstrasse 61, 8953 Dietikkon, Switzerland

[21] Appl. No.: 790,513

[22] Filed: Oct. 23, 1985

[30] Foreign Application Priority Data

Nov. 15, 1984 [DE] Fed. Rep. of Germany ....... 3441687

[51] Int. Cl.$^4$ .............................................. B23K 1/08
[52] U.S. Cl. ..................................... 228/56.2; 228/37
[58] Field of Search .................. 228/56.2, 37; 210/259

[56] References Cited

U.S. PATENT DOCUMENTS

| | | | |
|---|---|---|---|
| 2,230,385 | 2/1941 | Pecker | 210/259 X |
| 3,198,414 | 8/1965 | Tardoskegyi | 228/37 |
| 3,438,386 | 4/1969 | Diggins et al. | 228/37 X |
| 3,797,724 | 3/1974 | Flury et al. | 228/37 |
| 4,161,448 | 7/1979 | Erickson et al. | 210/259 X |

FOREIGN PATENT DOCUMENTS 1556546 11/1979 United Kingdom .

OTHER PUBLICATIONS

"Wave Solder Flux Automatic Feed System", Research Disclosure #24425, Aug. 1984, 2 pages, Kenneth Mason Publications Ltd., England.

Primary Examiner—Nicholas P. Godici
Assistant Examiner—Carmine Cuda
Attorney, Agent, or Firm—Max Fogiel

[57] ABSTRACT

The invention concerns a wave soldering device with a heated tub that accommodates molten solder, which is suctioned out of the tub by at least one pump and forced back into the tub through at least one nozzle to create at least one wave that falls back into the tub, with a layer of oil hat covers the surface of the solder in the tub, with an oil reservoir and oil cleaner, with a tub lip associated with the oil reservoir, and with an oil pump that communicates at the vacuum end with the oil reservoir and at the pressure end with the tub through an oil supply and associated heat exchanger.

15 Claims, 11 Drawing Figures

WAVE-SOLDERING DEVICE

The invention concerns a wave soldering device with a heated tub that accommodates molten solder, which is suctioned out of the tub by at least one pump and forced back into the tub through at least one nozzle to create at least one wave that falls back into the tub, with a layer of oil hat covers the surface of the solder in the tub, with an oil reservoir and oil cleaner, with a tub lip associated with the oil reservoir, and with an oil pump that communicates at the vacuum end with the oil reservoir and at the pressure end with the tub through an oil supply and associated heat exchanger.

The oil cleaner in a wave soldering device of this type that is known from German Patent No. 2 619 342 is an oil pass-through filter. The oil in the soldering device is constantly agitated in operation and accordingly continuously cleaned by the oil filter. When a filter that is fine enough to actually remove the oxides that occur in the form of a microscopic powder in the oil is employed, it becomes clogged after relatively few hours of operation and must be replaced, which is laborous and expensive. When on the other hand the filter is coarse, the oxides that occur in the form of a microscopic powder pass through it and mix with the solder, leading to defective soldering sites. The tub in this known wave soldering device also has a connection that supplies the oil and constitutes a heat exchanger that is intended to ensure that the oil circulating in the oil supply is hot enough when it arrives in the layer that covers the surface of the solder in the tub. A heat exchanger of this type, however, is not capable of heating the oil entering the solder wave hot enough to reliably prevent the wave from "freezing" because the oil in the reservoir must be kept as cool as possible to prevent thermal breakdown.

The object of the present invention is to provide a wave soldering device of the aforesaid type in which the oil cleaner will function optimally and not have to be cleaned frequently, the clean oil flowing back into the tub will be hot enough to prevent the solder wave from freezing, and energy requirements will be low.

This object is attained in accordance with the invention in that the oil cleaner is a centrifugal separator and in that the heat exchanger compensates for the loss of heat in the circulating oil by maintaining the temperature of the clean oil flowing back into the tub just slightly below the melting point of the molten solder. The centrifugal separator, which seldom needs to be cleaned, can separate the residue from the oil as finely as desired, depending only on the speed at which the separator rotates, whereas the heat exchanger in accordance with the invention will maintain the clean oil flowing back into the tub at the proper temperature.

One embodiment of the invention has a time switch that allows the centrifugal separator, oil pump, and heat exchanger to be operated at brief periodic intervals. This allows the protective layer of oil in the tub to be regularly exchanged during long interruptions in operation and cleaned of thermal breakdown products.

In another and preferred embodiment of the invention the oil reservoir communicates with an automatic flowmeter that replaces any additives originally in the oil that are consumed in a chemical reaction with the oxides in the solder and their residues are removed by the centrifugal separator.

Other practical embodiments and developments of the invention will be evident from the subsidiary claims 5 to 15.

The theory behind the invention will now be explained in greater detail in the following description with reference to several embodiments illustrated in the drawings.

Figure 1:
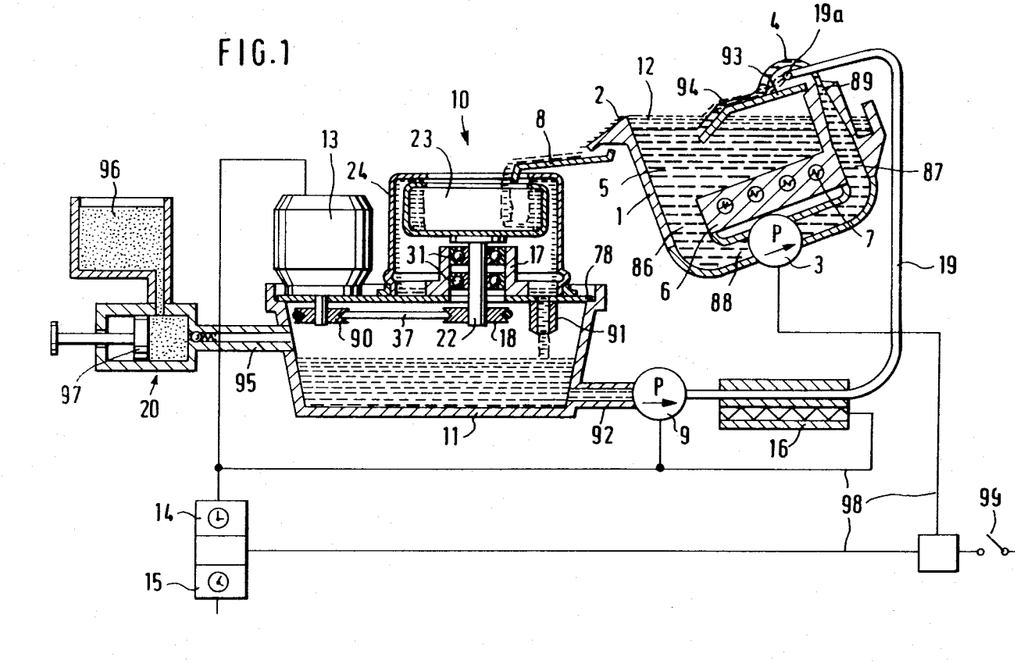
FIG. 1 is a section through a wave soldering device and its associated centrifugal separator in operation.

The wave soldering device illustrated in FIG. 1 has a slanted tub 1 full of molten solder 5 and with a heater 7 in the bottom 6. Also in the bottom 6 of tub 1 are two opposite perforations 86 and 87 that communicate through a line 88 and integrated solder pump 3. A nozzle 89 is connected to perforation 87. If nozzle 89 is slotted, a flat wave 4 of solder 5 flows out of it when the wave soldering device is in operation. During the soldering process a print is moved in a known way up to wave 4. On the molten solder 5 in tub 1 is a layer 12 of sufficiently heat-resistant protective oil that protects the solder form oxidizing. On the side of tub 1 that is remote from nozzle 89 is a pouring lip 2. Below lip 2 is a gutter 8 that leads into the drum 23 of a centrifugal separator 10. The center of the bottom of centrifuge drum 23 rests on a bearing 31 and mount 17 on a drive shaft 22 secured on a base plate 78 that rests on the edge of an oil reservoir 11. Drive shaft 22 extends through base plate 78 and its free end supports a drive wheel 18 that is connected by a drive belt 37 to a belt disk 90 mounted on the shaft of an electric motor 13. Centrifuge drum 23 and the mount 17 for the bearing 31 of drive shaft 22 are surrounded by a protective jacket 24 that is open at the top and is secured to and can be removed from base plate 78. Between mount 17 and protective jacket 24 there is an outlet 91 in base plate 78 that conveys the clean oil leaving centrifuge drum 23 into oil reservoir 11. Oil reservoir 11 communicates with the suction end of an oil pump 9 through a line 92. A pipe 19 leads from the pressure end of oil pump 9 into tub 1 through an electrically heated heat exchanger 16, the free end 19a of outlet 19 being provided with lateral bores and leading into wave 4. Below wave 4, a gutter 93 rests against nozzle 89 with its free end leading into molten solder 5. The oil that is pumped through pipe 19 by oil pump 9 mixes with the molten solder on gutter 93, immediately preventing it from oxidizing. The mixed stream 94 of oil and solder flows back into protective-oil layer 12 without causing it to splash or surge.

To periodically replace additives in the oil that are consumed by chemical reaction with the oxides in the solder, with their residues removed by centrifugal separator 10, oil reservoir 11 communicates with an automatic flowmeter 20 that introduces new additives. A supply line 95 deriving from flowmeter 20, which consists of an additive reservoir 96 and a downstream piston pump 97, empties above the surface of the oil in oil reservoir 11. Accordingly, when the wave soldering device is in operation, the oil in the device is constantly recirculated, being continuously cleaned in centrifugal separator 10 and periodically enriched with additives by flowmeter 20, whereas the heat lost from the circulating oil is replaced by the electrically heated heat exchanger 16 in such a way that the temperature of the clean oil flowing back onto gutter 93 is only slightly below the melting point of molten solder 5.

The motor 13 that drives centrifugal separator 10 is, along with oil pump 9, heat exchanger 16, and solder pump 3, controlled through electric lines 98 in such a way that, when solder pump 3 is turned on at switch 99, motor 13, oil pump 9, and heat exchanger 16 will also turn on. To at least partly refresh protective-oil layer 12 upon termination of the soldering process, the electric circuit that includes motor 13, oil pump 9, and heat exchanger 16 also has an after-running time switch 14 that keeps the oil circulating a while when solder pump 3 is turned off. To ensure that protective-oil layer 12 is regularly replaced and cleaned of thermal breakdown products when the wave soldering device is out of operation for a long period, the oil circulation can be kept in operation at regular intervals for a specific time independently of the operation of solder pump 3 with another time switch 15.

Figure 2:
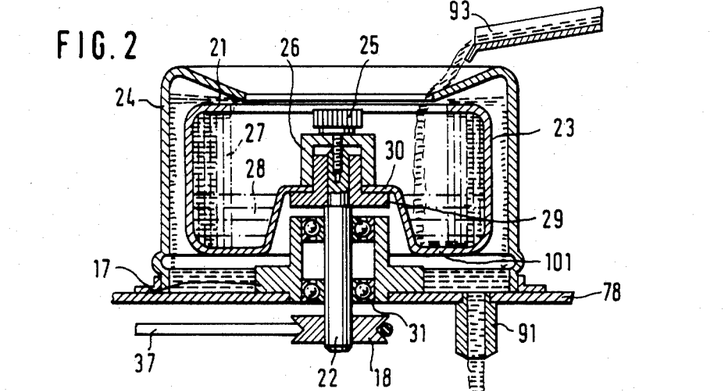
FIG. 2 is a section through an alternative embodiment of the centrifuge drum illustrated in FIG. 1.

In the embodiment illustrated in FIG. 2, which is a section through the vicinity of the drum of centrifugal separator 10, the oil flows from gutter 93 into centrifuge drum 23 over a funnel-shaped extension of protective jacket 24. Drum 23 has an inward-facing edge 21 and the center of its bottom 101 has an inward-facing offset 30 with an upper edge that parallels the bottom and is tensioned between a hub 29 and a bushing 26. Hub 29 rests on a drive shaft 22 and tension bushing 26 is secured with a knurled screw 25 in the face of drive shaft 22. Below hub 29, the mount 17 for the bearing 31 of drive shaft 22 rests on base plate 78. When centrifuge drum 23 is in operation, the clean oil splashes over drum-covering edge 21 against the inner surface of protective jacket 24. The clean oil flows down from the inner surface of the jacket onto base plate 78 and hence into oil reservoir 11 through an outlet 91. Drum 23 is dimensioned such that the upper edge of offset 30 is always above the maximal possible level of the resting volume 28 of oil, which corresponds to the operating volume 27 of the oil. Thus, when drum 23 is removed from protective jacket 24 to clean it of centrifugal residues, they cannot flow out through the central bore in the upper edge of offset 30.

Figure 3:
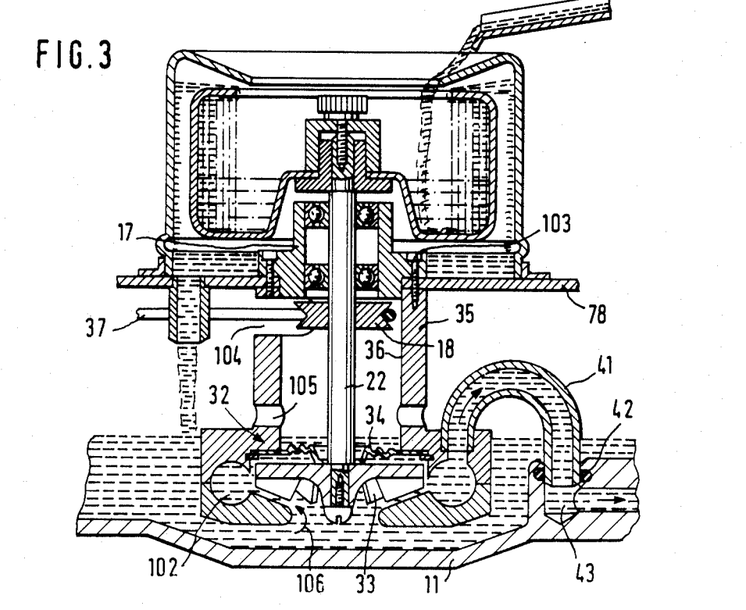
FIG. 3 illustrates another variant of the centrifugal separator illustrated in FIG. 1 with an integrated oil pump.

FIG. 3 illustrates the wave soldering device in FIG. 2 with a drive shaft 22 that extends down beyond drive wheel 18 into oil reservoir 11 and has at its end an oil pump 32 immersed in the oil in the reservoir. The direct mechanical connection between oil pump 32 and the drive shaft 22 of centrifugal separator 10 makes it possible to do without a separate motor to drive the pump. This embodiment also of course makes it possible to do without an oil pump 9 in the line 92 leading to tub 1. The housing of oil pump 32 is sectioned transversely with respect to drive shaft 22 in the vicinity of a pump channel 102, making it possible to replace pump wheel 33 along with a sealing mechanism 34 positioned above it without dismantling the top 35 of the housing. The inside diameter of housing neck 36, which is secured to the mount 17 for the bearing 31 of drive shaft 22 with screws 103, is long enough to make it possible to replace the drive belt 37 around drive wheel 18 through an opening 104 in housing neck 36 without dismounting bearing 31. Housing neck 36 is provided with oil-access apertures 105 above sealing mechanism 34 to allow any oil that gets through the mechanism to flow directly back into oil reservoir 11 and prevent it from collecting in housing neck 36. The U-shaped exit 41 from oil pump 32 is secured by means of a surge-limiting seal 42 in a line 43 rigidly fastened to oil reservoir 11. The line 19 to tub 1 extends from line 43. In operation the oil that has been cleaned in centrifuge drum 23 arrives in oil reservoir 11 through the outlets 91 in base plate 78, flows as a result of the rotation of pump wheel 33 into pump channel 102 through the intake 106 to oil pump 32, and is forced out into line 43 through exit 41.

Figure 4:
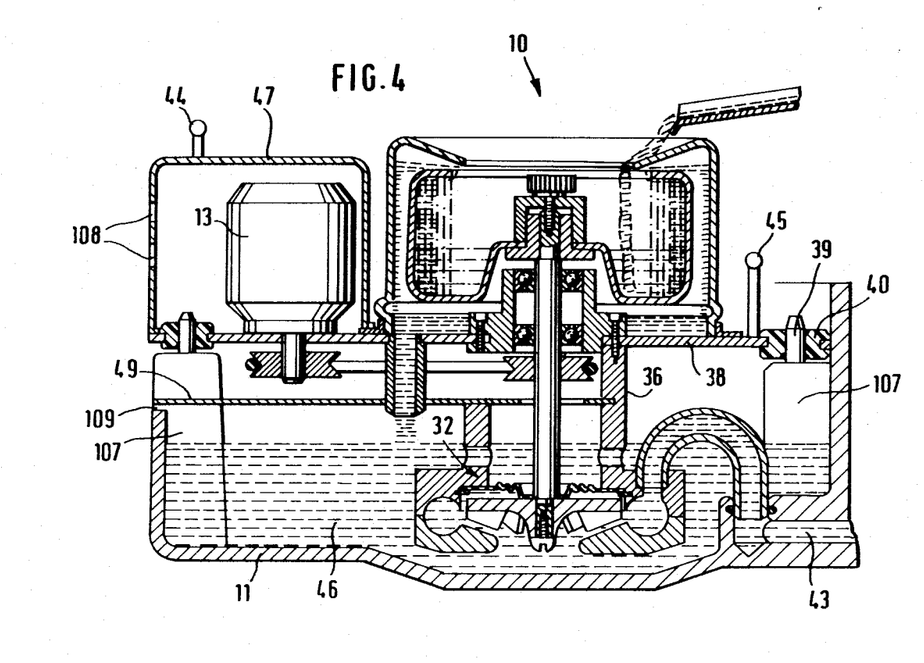
FIG. 4 illustrates a variant of the centrifugal-separator subassembly in FIG. 1 with an associated oil reservoir and integrated oil pump.

FIG. 4 is a larger-scale view of the detail of the wave soldering device in FIG. 3. The subassembly that consists of centrifugal separator 10, its associated motor 13, and oil pump 32 in this embodiment is secured to an assembly plate 38 that rests on vibration dampers 40 on supports 107 with positioning pins 39 inside oil reservoir 11. To protect against the heat emitted by the hot oil 46 in oil reservoir 11, the motor 13 that drives centrifugal separator 10 is accommodated in a housing 47 provided with air passages 108 on the side remote from the oil and drive belt 37 is covered above the oil with an insulating cover 49 that is also open and extends from the edge of oil reservoir 11 into the neck 36 of the housing for oil pump 32. There are air outlets 109 between the upper edge of oil reservoir 11 and the floor of cover 49. The subassembly as a whole can be lifted for maintenance out of oil reservoir 11 by means of handles 44 and 45 without releasing any connections.

Figure 5:
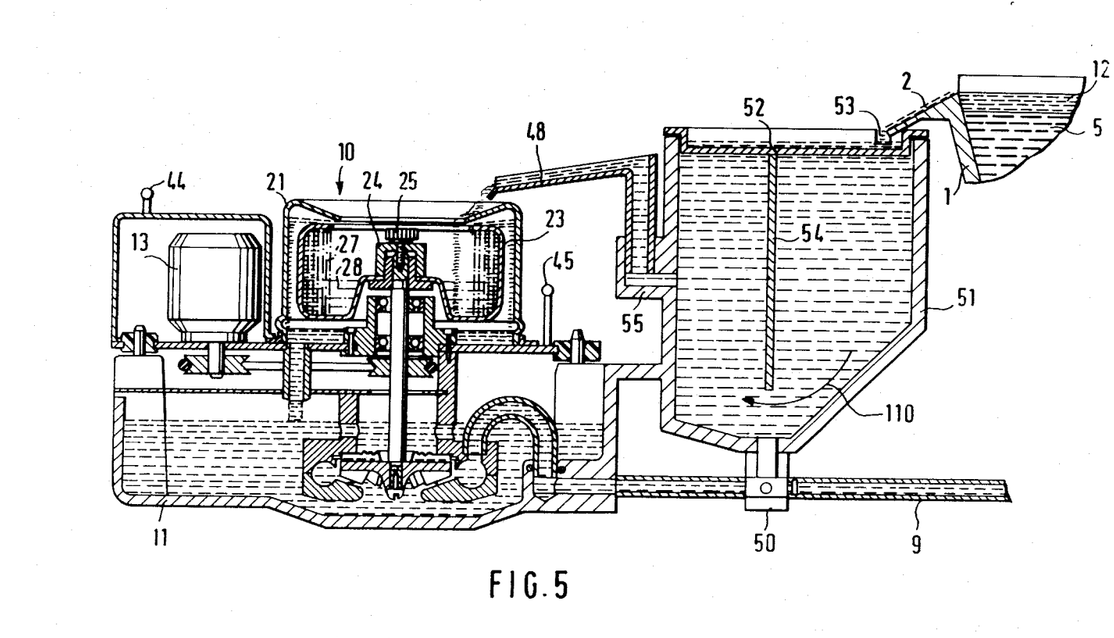
FIG. 5 illustrates another variant of the wave soldering device in FIG. 1 with an additional oil collector.

FIG. 5 is a larger-scale view of the wave soldering device in FIG. 4. Between the lip 2 on tub 1 and centrifugal separator 10 is an oil collector 51 that has a pivoting overflow 48 emptying into centrifugal separator 10 and that has an extraction cock 50 in its asymmetrical funnel-shaped bottom. Overflow 48 pivots to ensure that the total subassembly can still be lifted out of oil reservoir 11 with handles 44 and 45. Oil collector 51 is covered with a flat oil receiver 52 provided below the lip 2 on tub 1 with an inside oil overflow 53 that empties into oil collector 51. Oil receiver 52 collects any solder that splashes out of tub 1 and allows the resultingly previously cleaned oil to flow into oil collector 51 through oil overflow 53. Oil receiver 52 also functions as an insulating cover for oil collector 51. It has a baffle 54 at the bottom that extends beyond the outlet 55 for the oil flowing toward overflow 48 to just above extraction cock 50. Baffle 54 detours the oil entering oil collector 51 in the direction indicated by arrow 110 as it travels to outlet 55 so that the heavy constituents of the oil will collect at the bottom of the collector and can be drawn off through extraction cock 50. This helps relieve centrifugal separator 10.

Figure 6:
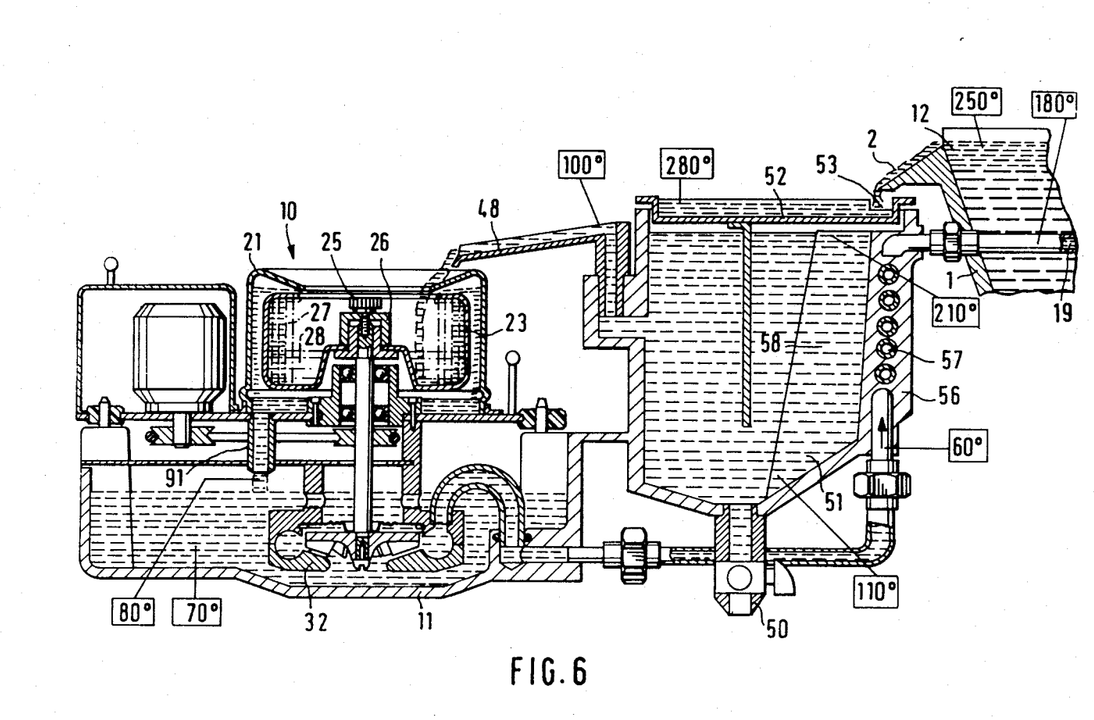
FIG. 6 is a view of the embodiment in FIG. 5 with an alternative type of additional oil collector.

FIG. 6 is another embodiment of the wave soldering device in FIG. 5. The wall of the oil collector 51 that faces toward the lip 2 on tub 1 has a counterflow heat exchanger 56. Counterflow heat exchanger 56 consists of a coil 57 cast into the wall of oil collector 51 and of heat-exchanger ribs 58 mounted thereon and extending into the collector. In operation, the hot oil in oil collector 51 cools as it flows down along ribs 58, and the clean oil arriving from oil reservoir 11 heats up as it flows up through the coil 57 in counterflow heat exchanger 56 into the line 19 leading to tub 1. This results more or less in the oil temperatures that will now be described. Protective-oil layer 12 is heated by heat exchanger 16 to a temperature of 250° C. The oil in oil receiver 52 has a temperature of 230° C. The oil at the bottom of oil collector 51 has cooled down to 110° C. and leaves the collector through overflow 48 at a temperature of 100° C. After being cleaned in centrifugal separator 10, the oil flows out of outlets 91 into oil reservoir 11 at a temperature of 80° C. In oil reservoir 11 the oil assumes a temperature of 70° C. and flows through oil pump 32 into counterflow heat exchanger 56 at a temperature of 60° C. The oil leaves counterflow heat exchanger 56 at a temperature of 160° C. and is heated to the initial temperature of protective-oil layer 12 again in electrically heated heat exchanger 16.

Figure 7:
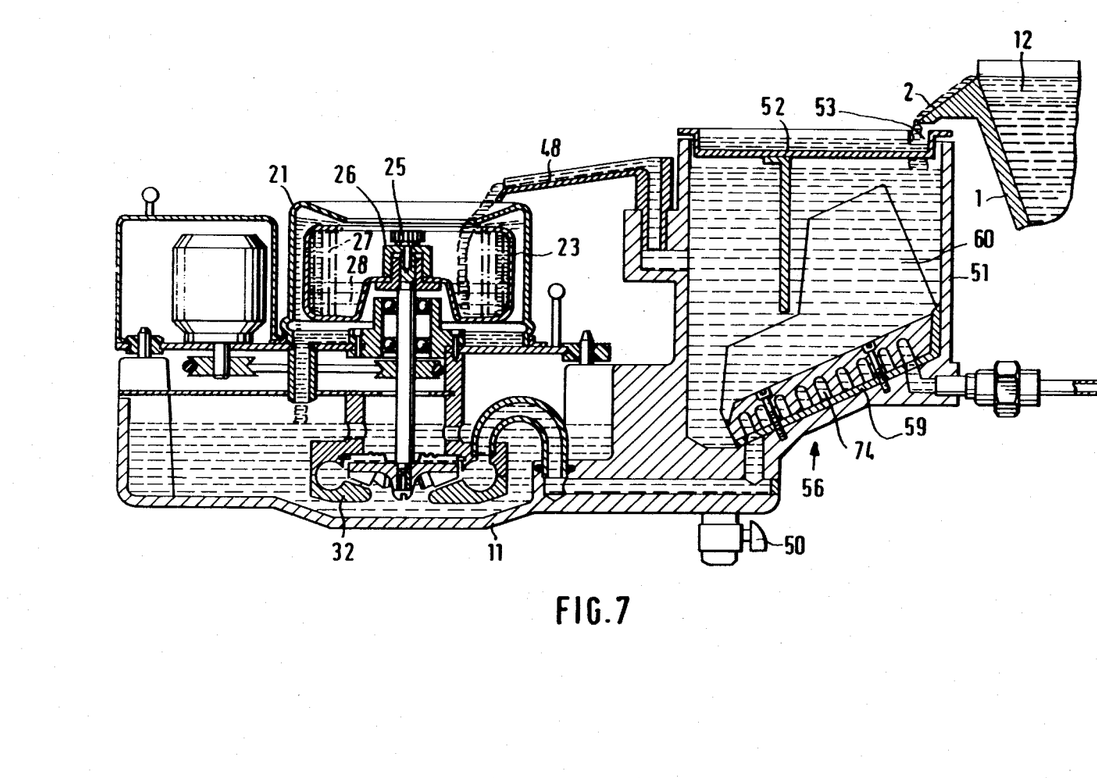
FIG. 7 is a view of the embodiment in FIG. 5 with another alternative type of additional oil collector.

The counterflow heat exchanger 56 in the variant of the wave soldering device in FIG. 6 illustrated in FIG. 7 consists of a heat-insulated metal component 59 on the bottom of oil collector 51 and of a meandering interior channel 74. The top of metal component 59 is provided with heat-exchanger ribs 60. The hot oil arriving from tub 1 flows past ribs 60 and heats up metal component 59. In the counterflow, the clean oil arriving from oil reservoir 11 is pumped through the meandering channel 74 inside metal component 59 and picks up the heat the component emits.

Figure 8:
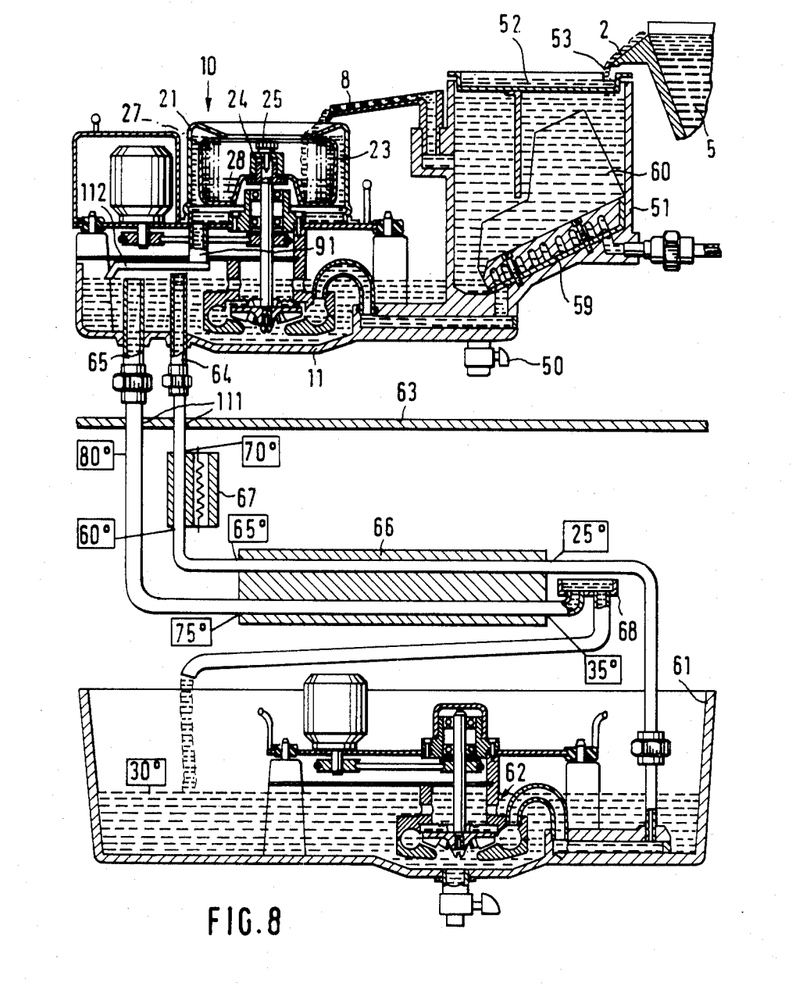
FIG. 8 is a view of the embodiment in FIG. 7 with another oil container and integrated oil-recirculation pump.

Another embodiment of the wave soldering device is illustrated in FIG. 8. Its design is basically the same as that in FIG. 7. Another and essentially larger oil container 61 is positioned below oil reservoir 11, which has a partition 63 with level-equalizing apertures 111 between an overflow 65 for the oil arriving from centrifugal separator 10 and an access 64 for the oil flowing back out of oil container 61. The oil arriving from centrifugal separator 10 is introduced into oil reservoir 11 next to overflow 65 through outlets 91 and a subsequent pipe 112 supported on partition 63. The oil then flows from overflow 65 into a ventilating vessel 68 through a counterflow heat exchanger 66 and thence into larger oil container 61. The oil is conveyed from oil container 61 to the access 64 to oil reservoir 11 through counterflow heat exchanger 66 and through an electrically heated afterheater 67 by means of a pump 62. The oil flowing into the overflow has a temperature of 80° C. and enters counterflow heat exchanger 66 at a temperature of 75° C. The oil leaves counterflow heat exchanger 66 at a temperature of 35° C. and cools down to 30° in oil container 61. The oil enters counterflow heat exchanger 66 at a temperature of 25° C. and is heated to 65° in it. Due to heat loss in the line, the oil now arrives at afterheater 67 at a temperature of 60° C. and leaves at a temperature of 70° C., mixing with the oil in oil reservoir 11 after emerging from access 64.

Figure 9:
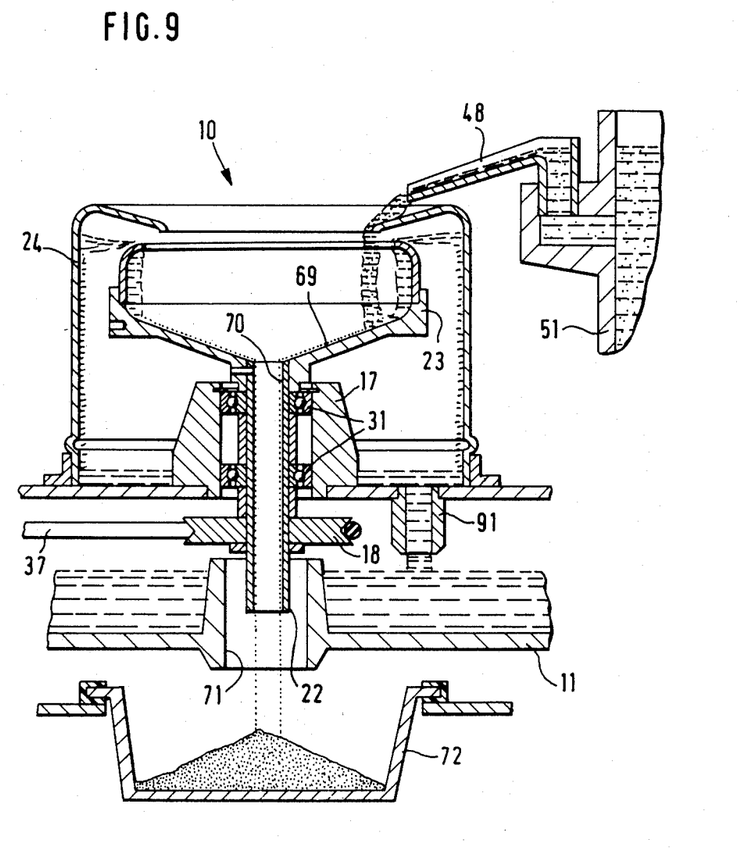
FIG. 9 is a section through part of another variant of the centrifugal-separator subassembly in FIG. 1.

The partial section in FIG. 9 represents another variant of the wave soldering device. The bottom 69 of the centrifuge drum 23 in centrifugal separator 10 is funnel-shaped and the separator drive shaft 22 is in the form of a pipe 70. Oil reservoir 11 has a tubular perforation 71 that pipe 70 empties into. Below perforation 71 is a collector 72, into which the residues from the drum drop through pipe 70 when the drum is stationary. This results in automatic self-cleaning of the drum.

Figure 10:
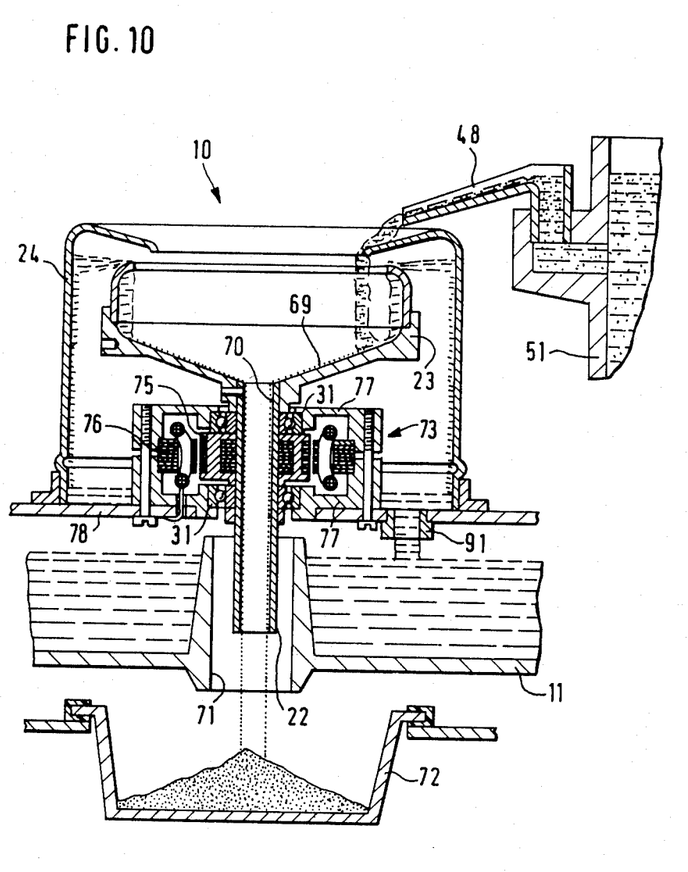
FIG. 10 is a variant of the embodiment in FIG. 9.

Another embodiment of the wave soldering device in FIG. 9 is illustrated in FIG. 10. The rotor 75 of a flat short-circuit armature motor 73 is fastened to the pipe 70 that functions as the drive shaft 22 for centrifugal separator 10. Motor swivels 77 secure both a stator 76 and the bearing 31 for centrifugal separator 10, with the total face of the bottom swivel resting against a highly heat-conductive base plate 78.

Figure 11:
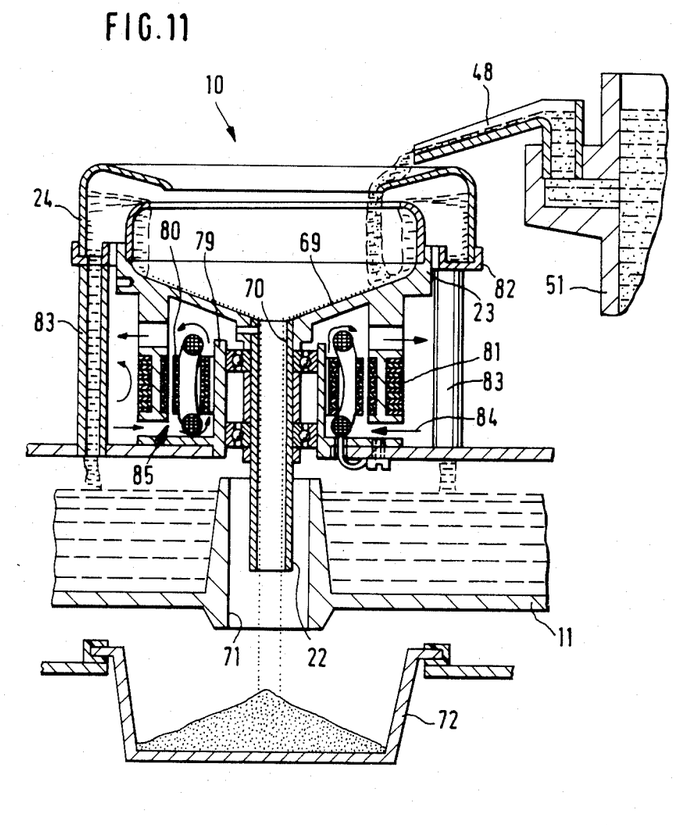
FIG. 11 is another variant of the embodiment in FIG. 9.

The outside of the mount 79 for the bearing 31 of the drive shaft 22 in the centrifugal separator 10 illustrated in FIG. 11 supports the stator 80 of an external-rotor motor 85, whereas its rotor 81 is an integral component of the bottom 69 of the centrifuge drum 23 in centrifugal separator 10. The protective jacket 24 around centrifugal separator 10 rests in a continuous gutter 82 with a U-shaped cross-section that communicates with oil reservoir 11 through runoff pipes 83 supported on base plate 78. This allows free access for cool air to external-rotor motor 85 in the direction indicated by arrows 84.

The wave soldering device can in a practical way be programmed in such a way that the run-up time of centrifugal separator 10 is compared to a reference time that corresponds to the run-up time of a separator subjected to heavy residues and a message to clean the separator is issued when the two times are equal.

I claim:

1. A wave soldering arrangement comprising: a heated tub for holding molten solder having a melting point; nozzle means; pump means for pumping molten solder out of said tub and forcing said solder back into said tub through said nozzle means to produce at least one wave dropping back into said tub; an oil reservoir; a tub lip on said tub; oil pump means with a vacuum end communicating with said oil reservoir; oil supply means with heat exchanger means, said oil pump means having a pressure end communicating with said tub through said oil supply means and said heat exchanger means; oil cleaner means comprising a centrifugal separator in a flow path of the oil; said heat exchanger means compensating for heat loss in the oil flow by maintaining temperature of cleaned oil flowing back into said tub a predetermined relatively small amount below the melting point of said molten solder, said cleaned oil flowing back into said tub being hot enough to prevent the solder wave from freezing; said centrifugal separator being rotated at a speed dependent on the fineness of residue to be separated from the oil; time switch means for operating said centrifugal separator, said oil pump means, and said heat exchanger means at substantially brief periodic intervals for allowing said layer of oil in said tub to be exchanged during substantially long operating interruptions and cleaned of thermal breakdown products.

2. Wave soldering device as in claim 1, characterized in that a centrifuge drum (23) of the centrifugal separator (10) has an inward-facing edge (21) and is fastened with a knurled screw (25) and a tension bushing (26) to a hub (29) that rests on the drive shaft (22) of the centrifugal separator (10) and in that the center of its bottom has an inward-facing offset (30) with an upper edge that parallels the bottom and is tensioned between the hub and the bushing, whereas the drum 23 is dimensioned such that the upper edge of the offset is always above the maximal possible level of the resting volume (28) of oil, which corresponds to the operating volume (27) of the oil.

3. Wave soldering device as in claim 1 characterized in that a drive shaft (22) of the centrifugal separator (10) extends down beyond its drive wheel into the oil reservoir (11) and has at that end an oil pump (32).

4. Wave soldering device as in claim 1, characterized in that the subassembly that consists of the centrifugal separator (10), its associated motor (13), and the oil pump (32) is secured to an assembly plate (38) that rests on vibration dampers (40) on supports with positioning pins (39) for the oil reservoir (11) and in that the exit (41) from the oil pump (32) is secured by means of a surge-limiting seal (42) in a line (43) rigidly fastened to the oil reservoir (11) and leading to the tub (1).

5. Wave soldering device as in claim 1, characterized in that a motor (13) that drives the centrifugal separator (10) is accommodated in a housing (47) that opens to the environment on the side remote from the hot oil (46) in the oil reservoir (11) and the drive belt (37) is covered above the oil with an insulating cover (49) that is also open to the environment.

6. Wave soldering device as in claim 1, characterized in that an oil collector (51) is covered with a flat oil receiver (52) provided below the lip (2) on tub (1) with an inside oil overflow (53) that empties into the oil collector (51) and in that the oil receiver (52) has a poorly heat-conducting baffle (54) at the bottom that extends beyond the outlet (55) for the oil flowing toward the overflow (48) to the vicinity of extraction cock 50.

7. Wave soldering device as in claim 1 characterized in that the area of an oil collector (51) that faces toward the lip (2) on the tub (1) has a counterflow heat exchanger (56).

8. Wave soldering device as in claim 1 characterized in that a heat-insulated metal component (59) on the bottom of the oil collector (51) has a meandering interior channel (74) and the top has heat-exchanger ribs (60), whereby the hot oil flows past the ribs and cools off and the clean oil flows up through the channel and heats up.

9. Wave soldering device as in claim 1, characterized in that another and essentially larger oil container (11) below the oil reservoir (11) has a partition (63) with level-equalizing apertures (111) between an overflow (65) for the oil arriving from the centrifugal separator (10) and an access (64) for the oil flowing back out of the oil container (61), whereby the oil is conveyed from the oil container (61) to the access (64) to the oil reservoir (11) through a counterflow heat exchanger (66) and through an electrically heated afterheater (67) by means ot a pump 62 and whereby the clean oil flows through the overflow, the heat exchanger, and a ventilating vessel (68) into the larger oil container.

10. Wave soldering device as in claim 1, characterized in that the bottom (69) of the centrifuge drum (23) in the centrifugal separator (10) is funnel-shaped and the separator drive shaft (22) is in the form of a pipe (70), in that the oil reservoir (11) has a tubular perforation (71) that the pipe (70) empties into, and in that below the perforation is a collector (72), into which the residues from the drum drop through the pipe when the drum is stationary.

11. Wave soldering device as in claim 1 characterized in that the outside of the mount (79) for the bearing (31) of the drive shaft (22) in the centrifugal separator (10) supports the stator (80) of an external-rotor motor (85), in that the rotor (81) of the external-rotor motor is an integral component of the bottom (69) of the centrifuge drum (23) in the centrifugal separator (10), and in that the protective jacket (24) around the centrifugal separator (10) rests in a continuous gutter (82) with a U-shaped cross-section that communicates with the oil reservoir (11) through runoff pipes (83) supported on the base plate (78).

12. A wave soldering arrangement as defined in claim 1, wherein said heat exchanging means is electrically heated.

13. A wave soldering arrangement as defined in claim 1, including an automatic flowmeter communication with said oil reservoir and replacing additives originally in the oil and removed therefrom in a chemical reaction with oxides in the solder, residues of the oxides being removed by said centrifugal separator.

14. A wave soldering device as defined in claim 1, wherein said centrifugal separator is programmed so that run-up time of said separator is compared to a reference time corresponding to run-up time of a separator subjected to heavy residues, a message to clean said separator being issued when the two times are equal.

15. A wave soldering arrangement comprising: a heated tub for holding moltem solder having a melting point; nozzle means; pump means for pumping molten solder out of said tub and forcing said solder back into said tub through said nozzle means to produce at least one wave dropping back into said tub; an oil reservoir; a tub lip on said tub; oil pump means with a vacuum end communicating with said oil reservoir; oil supply means with heat exchanger means, said oil pump means having a pressure end communicating with said tub through said oil supply means and said heat exchanger means; oil cleaner means comprising a centrifugal separator in a flow path of the oil; said heat exchanger means compensating for heat loss in the oil flow by maintaining temperature of cleaned oil flowing back into said tub a predetermined relatively small amount below the melting point of said molten solder, said cleaned oil flowing back into said tub being hot enough to prevent the solder wave from freezing; said centrifugal separator being rotated at a speed dependant on the fineness of residue to be separated from the oil; said heat exchanger means being electrically heated; time switch means for operating said centrifugal separator, said oil pump means, and said heat exchanger means at a substantially brief periodic intervals for allowing said layer of oil in said tub to be exchanged regularly during substantially long operating interruptions and cleaned of thermal breakdown products; an automatic flowmeter communicating with said oil reservoir and replacing additives originally in the oil and removed in a chemical reaction with oxides in the solder, residues of the oxides being removed by said centrifugal separator, said centrifugal separator being programmed so that run-up time of said separator is compared to a reference time corresponding to run-up time of a separator subjected to heavy residues, a message to clean the separator being issued when the two times are equal.

* * * * *